Sept. 16, 1969      J. D. CONTI      3,467,566
METHOD FOR WET LAMINATING HYDROPHILIC FILMS
Filed Jan. 14, 1966
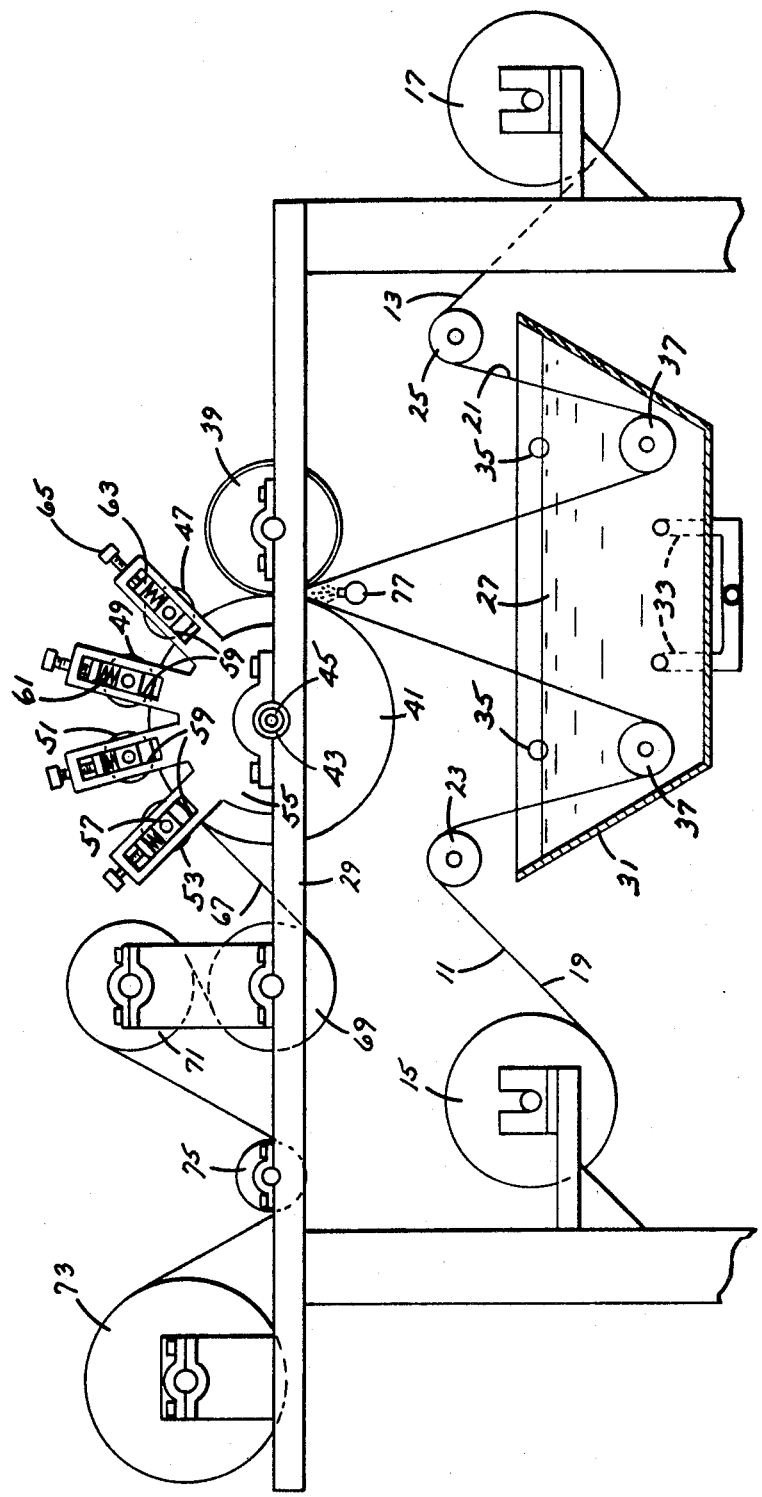

United States Patent Office 3,467,566
Patented Sept. 16, 1969

3,467,566
METHOD FOR WET LAMINATING
HYDROPHILIC FILMS
John D. Conti, Elkins Park, Pa., assignor to FMC Corporation, Philadelphia, Pa., a corporation of Delaware
Filed Jan. 14, 1966, Ser. No. 520,707
Int. Cl. B32b 23/14, 31/08
U.S. Cl. 156—307                6 Claims

ABSTRACT OF THE DISCLOSURE

Method in which dry hydrophilic sheet materials, having a substantially dry coating of thermoplastic material on at least one side of each pair of opposing sides, are humidified within a heated water bath and then laminated to each other under heat and gradually increasing pressure.

---

This invention relates to the production of composite articles, and more particularly to an improved method for laminating water-insoluble hydrophilic sheet materials.

In accordance with conventional procedures, hydrophilic sheet materials which are to be laminated are coated on at least one of the opposing sides thereof with a thermoplastic material and then combined, generally, by being passed between pressure rollers. The sheet materials may be coated, for example, by known solvent coating or melt extrusion procedures, and may be combined before or after the applied thermoplastic material has set. In the latter instance the pressure rollers are heated to again render the applied coating tacky as the sheet materials are pressed therebetween.

A significant disadvantage of these known procedures is that the heat applied to the hydrophilic sheet materials during the coating and/or laminating operations causes considerable moisture to escape from the sheet materials. Humidification of the resulting laminated product may, of course, render it suitable for its intended uses. However, such humidifying operations are generally slow and costly and are often unsatisfactory especially when appreciable quantities of moisture must be restored into the product. Accordingly, a primary object of this invention is to provide a generally new or improved and more satisfactory method for laminating hydrophilic sheet materials.

Another object of the invention is to provide an improved method for laminating hydrophilic sheet materials under heat and pressure while permitting only a minimum escape of moisture therefrom.

Still another object of the invention is the provision of an improved method in which hydrophilic sheet materials are laminated to each other under heat and increasing pressure after having been humidified.

A further object is to provide an improved high speed and continuous method for laminating humidified films formed of hydrophilic materials.

A still further object is the provision of an improved method in which traces of solvent are removed from freshly coated films during the humidification thereof.

Still further objects will appear from the following description.

These objects are accomplished in accordance with the present invention by a method wherein two or more water-insoluble hydrophilic sheet materials or films are laminated to each other, under heat and pressure, immediately after being humidified by immersion within a water bath. The sheet materials to be laminated in accordance with the method of the present invention are provided with a continuous coating of thermoplastic material on at least one side of each pair of opposing sides. Preferably, such coatings are heated rapidly and for only a short duration up to or within their softening temperature range during the laminating stage of the method to assure a good bond with a minimum escape of moisture and, when transparent sheet materials are being combined, to preserve the clarity thereof.

The sheet materials are initially immersed within the heated water bath in spaced apart relationship so that humidification can occur along all surfaces thereof. The temperature of the water bath can be varied as desired but is preferably maintained at a temperature approaching but less than its boiling point to facilitate rapid penetration thereof into the sheet materials. Optionally the sheet may be preheated before being immersed within the water bath to thereby minimize the amount of heat which must be supplied by the bath itself. The water bath will, of course, heat the coatings so that only a minimum of heat need be applied during the actual laminating stage. When applicable, the heated water bath may serve also to soften the coatings of thermoplastic material carried by the sheet materials. If desired, the water bath may include other materials, such as plasticizers or coating softeners, dyes, etc.

Upon being removed from the heated water bath sheet material and/or coating modifiers, such as plasticizers or solvents, dyes, etc., may be applied to the opposing sides of the humidified sheet materials, as by spraying.

As the sheet materials are being pressed together during the laminaitng stage they are rapidly heated to a temperature preferably within and even perhaps slightly above the softening range of the thermoplastic material forming the coatings thereon and are maintained at such temperature for only a short period. Only a minimum of heat need be applied during the laminating stage since the coatings of thermoplastic material retain much of the heat which they had assumed during their passage through the heated water bath.

During the laminating stage, successive portions of the humidified and still hot sheets are initially overlapped with each other with a squeezing action so as to avoid the entrapment of free liquid and gas bubbles therebetween. Once overlapped, gradually increasing pressure is applied to the sheet materials concomitantly as they are heated to soften the coatings thereon. In this manner a strong and uniform bond is achieved between the sheet materials with a minimum amount of heat being applied for only a short period. Moreover, an opportunity is provided for the coatings of thermoplastic material to blend with each other without experiencing any apparent flow. Thus, it has been found that striations or other imperfections which may have existed in the original coatings are not present in the resulting laminated or composite product.

After being laminated the resulting composite product is rapidly cooled and collected or perhaps passed through a known humidifying apparatus to adjust its moisture content to a desired level.

The preferred apparatus for use in carrying out the above described method includes a tank for containing a hot water bath through which the sheet materials are advanced in spaced apart relationship, a steel temperaature roller which cooperates with a rubber-covered squeeze roller and a series of pressure rolls for combining the sheet materials into a composite product after they have been humidified, and chill rollers for rapidly cooling the resulting product. The surface of the steel roller is kept at a desired temperature by electrical heaters and/or a suitable heated fluid which is circulated within the interior thereof. The pressure rolls press the overlapped sheet materials together as they travel with the temperature roller and are individually adjustable so as to subject the overlapped sheet materials to gradually increasing pressure.

Preferably, at least two chill rollers are employed, with the resulting composite product being laced so that the opposite sides thereof are engaged with such rollers. The chill rollers themselves are of conventional construction and are maintained at a desired temperature as by circulating a cooled liquid therethrough.

When it is desired to apply modifiers to the opposing surfaces of the sheet materials after humidification, application rolls and preferably a spray unit is positioned in advance of the cooperating temperature and squeeze rollers.

As heretofore noted, laminating of the sheet materials immediately after they have been immersed within a water bath minimizes the escape of moisture from the sheet materials before and during the actual application of heat and pressure. Further, when solvent coated sheet materials are laminated in accordance with the method of the present invention, it has been found that all residual traces of solvent are removed so that the resulting composite product is well adapted for use with food products and also exhibits good performance on automatic packaging and heat sealing equipment.

The laminating method of the present invention is not limited to any particular water-insoluble hydrophilic sheet materials or to sheet materials having coatings of only certain thermoplastic materials which are applied to the sides thereof. One or both of the opposing sides of the sheet materials which are to be laminated may be provided with a coating of thermoplastic material and, if desired, the individual sheet materials may each be coated on their opposite sides with the same or different thermoplastic materials. The hydrophilic sheet materials to be laminated may be in the form of individual sheets or continuous films, webs, bands, ribbons, and the like.

For the sake of clarity and simplicity, the method of the present invention is hereafter described as applied to laminating a pair of continuous, transparent regenerated cellulose films formed from viscose, which is commonly known as cellophane, and which are provided with a vinyl coating on at least each of the opposing sides thereof. More specifically, the thermoplastic coating material is selected from the group consisting of polyolefins having molecular weights of from 10,000 to 100,000 and densities in g./cc. of from 0.88 to 0.97 and interpolymers containing 50 to 95% by weight of vinylidene chloride, as more fully described in U.S. Patent No. 3,037,868. The thermoplastic material may be applied onto the individual regenerated cellulose films by melt extrusion procedures, which is preferred in the case of polyolefin coatings, or from a lacquer or emulsion, as is preferred when vinylidene chloride interpolymers are employed. In view of the rapid and extensive humidification effected during the method of the present invention, humidification of the individual regenerated cellulose films by conventional procedures to restore moisture lost during the coating operation is neither necessary nor particularly desired.

The single figure of the drawing diagrammatically illustrates an apparatus which is suitable for use in the method of the present invention.

Referring now to the drawing, transparent regenerated cellulose films to be laminated, indicated at 11 and 13, are together drawn from supply rolls 15 and 17 with their coated sides 19 and 21 disposed in opposing relationship, passed about separate guide rolls 23 and 25, and then immersed within a heated water bath 27. As illustrated the supply rolls 15 and 17 are carried by a frame 29 which also supports film laminating apparatus as hereafter described. A tank 31 contains the water bath 27 which is maintained at a desired depth and elevated temperature by the continuous supply of hot water through inlet pipes 33 and the removal of excess water through discharge pipes 35. If desired, additional heat may be supplied to the bath 27, as by suitable steam coils, located within the tank itself. With regenerated cellulose films coated with the particular vinyl materials heretofore mentioned, the bath 27 may be heated up to about 100° C.

Within the water bath 27, the films 11 and 13 are laced about independent guide rolls 37 to change their directions of travel and are then brought together, for the first time, after being withdrawn from the bath and as they are passed in-between a rubber covered squeeze roller 39 and a temperature roller 41. During their travel through the water bath 27, the films 11 and 13 assume comparatively large quantities of moisture since the water bath is at a high temperature and is in contact with all surfaces of the two films. The high temperature of the water bath 27 serves also to at least encourage softening of the coated sides 19 and 21 of the respective films 11 and 13 and thus prepares them for bonding with each other as they move in-between the pressure and temperature rollers.

The temperature roller 41 is of steel construction and is preferably maintained heated up to, within or even slightly above the softening temperature range of the thermoplastic coating material, as by a hot liquid which is circulated through the interior thereof by conduits 43 and 45. As more fully described in U.S. Patent No. 3,037,868, noted above, coatings formed of polyethylenes having a molecular weight in the approximate range of 10,000 to 20,000 and a density in the range of about 0.91 to 0.95 g./cc. will soften within the temperature range of from about 100° C. to 110° C. Polypropylenes, on the other hand, having molecular weights of between about 30,000 and 50,000 and a density in the range of about 0.88 to 0.90 g./cc. will soften at a temperature within the range of from 100° C. to 125° C.

The pressure and temperature rollers 39 and 41 are both supported for rotation on the frame 29 and include suitable means not shown for rotating the same at the same linear rate of speed. The squeeze roller 39 cooperates with the temperature roller 41 to overlap successive portions of the humidified and still hot films together as they are advanced from the bath 27 and thereby prevents the entrapment of water or gases therebetween. Entrapped water and/or gases not only insulates the coated sides 19 and 21 from the applied heat but also causes the films to be distorted. Thus, as the overlapped and still heated films 11 and 13 travel in-between the cooperating pressure and temperature rollers 39 and 41, any moisture remaining between the film is squeezed therefrom and the films are pressed and advanced together with the roller 41 for heating to a still higher temperature.

A series of pressure rolls 47, 49, 51 and 53 are supported about a portion of the periphery of the roller 41 by bearing plates 55 which are fixed to the frame 29. Each of the rolls 47, 49, 51 and 53 is rotatably supported at its ends by separate pairs of blocks 57 which are slidably mounted within slots 59 formed in the bearing plates 55 along planes extending radially of the roller 41. A compression spring 61 is disposed between each slide block 57 and a pressure plate 63, the latter of which is adjustable longitudinally of the respective slot 59 by a screw 65.

With this arrangement, the pressure exerted by the individual rolls 47, 49, 51 and 53 on the overlapped films as they travel with the roller 41 can be individually adjusted. Preferably, the rolls 47, 49, 51 and 53 are adjusted so as to exert gradually increasing pressure on the overlapped films as they are carried relative thereto by the roller 41. Thus, the pressure on the overlapped films is generally made greater as the temperature of the films is increased to a desired level so that the coatings on the opposed sides of the films are made to blend with each other without experiencing any apparent flow.

The laminated films are removed from the roller 41 as a composite product 67, laced about chill rolls 69 and 71 to cool the same from opposite sides thereof and is then collected on a suitable core as a roll 73. The chill rolls 69 and 71 are driven by suitable means, not shown, and preferably an idler roll 75 is employed to insure a substantial wrapping of the product 67 about the chill roll 71.

As heretofore mentioned, coating and/or film modifiers, such as softeners or plasticizers, dyes, etc., may be applied to the opposite sides of the films after they leave the bath 27 and as they approach the rollers 39 and 41. These modifiers are preferably applied in the form of a fine mist as by an elongated spray nozzle 77.

With the above method, it has been found that transparent regenerated cellulose films having thermoplastic coatings as described above, could be laminated at speeds of about 600 feet per minute by first passing the separate films through a water bath maintained at a temperature of from about 88° to 91° C. and then gradually pressing the same together while they are heated to within the softening temperature range of the coating as they travel with the roll 41. The resulting composite products have a moisture content of at least 6.0 to 7.5% and, at slower speeds, moisture contents of as high as 11.0% could be achieved. Further, by modifying the thermoplastic coatings of the humidified films, as by applying a fine mist of benzyl alcohol from the nozzle 77, the rate of film lamination could be increased to well over 600 feet per minute and/or the temperature of the roll could be reduced to about 96° to 99° C., which is below the softening temperature range of the film coatings. In both modes of operation, the resulting composite products exhibited good bonds between the films and a clarity which was as good, and often better, than the original films since striations which existed in the individual film coatings were eliminated as such coatings blended together under heat and pressure.

I claim:

1. A method of making a composite product from a plurality of substantially dry hydrophilic sheet materials having a substantially dry coating of thermoplastic material on at least one side of each pair of opposing sides thereof including the steps of immersing the sheet materials within a heated water bath in spaced apart relationship to humidify the sheet materials and heat the coatings thereon, remvoing the humidified sheet materials from the heated water bath and overlapping together successive portions thereof, heating the overlapped sheet materials to within the softening range of the coatings of thermoplastic material while concomitantly applying gradually increasing pressure to successive portions thereof to thereby laminate the same into a composite product, removing the pressure from the composite product and cooling the same.

2. A method as defined in claim 1 wherein the overlapped sheet materials are heated from one side thereof.

3. A method as defined in claim 1 wherein the water bath is heated to a temperature approaching but less than 100° C.

4. A method as defined in claim 1 further including the step of applying a coating modifying medium to the opposing sides of the sheet materials as they are overlapped with each other.

5. A method as defined in claim 4 wherein the sheet materials are formed of regenerated cellulose and wherein the coatings comprise a material selected from the group consisting of polyolefins having a molecular weight of from 10,000 to 100,000 and densities in g./cc. from 0.88 to 0.97 and interpolymers containing 50 to 95% by weight of vinylidene chloride.

6. A method as defined in claim 4 wherein the sheet materials are formed of regenerated cellulose which are coated on at least one of their opposing sides with a composition containing from 50 to 95% by weight of vinylidene chloride and wherein said coating modifying medium is benzyl alcohol.

References Cited

UNITED STATES PATENTS

| | | | |
|---|---|---|---|
| 290,553 | 12/1883 | Edson | 156—543 |
| 2,171,259 | 8/1939 | Scott | 156—269 |
| 2,273,677 | 2/1942 | Wallach | 156—551 XR |
| 2,434,795 | 1/1948 | Glasing et al. | 156—549 XR |

EARL M. BERGERT, Primary Examiner

M. E. McCAMISH, Assistant Examiner

U.S. Cl. X.R.

156—312, 550